(12) United States Patent
Yoshizaki et al.

(10) Patent No.: US 12,531,462 B2
(45) Date of Patent: Jan. 20, 2026

(54) BATTERY-DRIVEN MOTOR AND MOTOR-DRIVEN SYSTEM

(71) Applicant: JFE STEEL CORPORATION, Tokyo (JP)

(72) Inventors: Souichiro Yoshizaki, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 172 days.

(21) Appl. No.: 18/548,968

(22) PCT Filed: Feb. 24, 2022

(86) PCT No.: PCT/JP2022/007743
§ 371 (c)(1),
(2) Date: Sep. 5, 2023

(87) PCT Pub. No.: WO2022/202085
PCT Pub. Date: Sep. 29, 2022

(65) Prior Publication Data
US 2024/0154507 A1    May 9, 2024

(30) Foreign Application Priority Data
Mar. 24, 2021  (JP) ................. 2021-050812

(51) Int. Cl.
*H02K 21/14*  (2006.01)
*H02K 1/02*  (2006.01)
*H02K 1/18*  (2006.01)

(52) U.S. Cl.
CPC ............... *H02K 21/14* (2013.01); *H02K 1/02* (2013.01); *H02K 1/18* (2013.01)

(58) Field of Classification Search
CPC ..... C22C 38/008; C22C 38/02; C22C 38/004; C22C 38/14; C22C 38/002; C22C 38/60;
(Continued)

(56) References Cited

U.S. PATENT DOCUMENTS 5,993,568 A * 11/1999 Takada ................. C21D 8/1277
148/307
11,401,589 B2 * 8/2022 Zaizen ................. C22C 38/004
(Continued)

FOREIGN PATENT DOCUMENTS

EP       3725906 A1    10/2020
JP       H0849044 A    2/1996
(Continued)

OTHER PUBLICATIONS

JP-4289665-B2 machine translation Jun. 11, 2025.*
(Continued)

*Primary Examiner* — Leda T Pham
(74) *Attorney, Agent, or Firm* — KENJA IP LAW PC

(57) ABSTRACT

To provide a battery-driven motor and a motor-driven system that achieve high output density without compromising overall system efficiency, a battery-driven motor is supplied electric power from a battery via an inverter to drive a load, wherein current supplied from the battery is 3.0 C or more when driven at maximum output, the battery-driven motor including a stator core (12) provided with an electrical steel sheet as an iron core material that has a magnetic flux density of 1.65 T or more at a magnetic field strength of 5,000 A/m and an iron loss of 40.0 W/kg or less under sinusoidal excitation of 1 kHz-1.0 T.

6 Claims, 6 Drawing Sheets

(58) Field of Classification Search
CPC .... C21D 6/008; C21D 8/1233; C21D 8/1222; C21D 8/1261; C21D 9/46; B32B 15/011; H01F 1/14775

See application file for complete search history.

(56) References Cited

U.S. PATENT DOCUMENTS

| | | | |
|---|---|---|---|
| 2013/0022833 | A1 | 1/2013 | Wakade |
| 2016/0099635 | A1 | 4/2016 | Liang et al. |
| 2019/0112697 | A1 | 4/2019 | Hiratani et al. |
| 2020/0399731 | A1 | 12/2020 | Ichie et al. |
| 2021/0134500 | A1* | 5/2021 | Oda ................... C22C 38/008 |
| 2022/0243298 | A1 | 8/2022 | Yoshizaki et al. |

FOREIGN PATENT DOCUMENTS

| | | | |
|---|---|---|---|
| JP | 2002272022 | A | 9/2002 |
| JP | 2005050918 | A | 2/2005 |
| JP | 2006024869 | A | 1/2006 |
| JP | 2007221869 | A | 8/2007 |
| JP | 4289665 | B2 * | 7/2009 |
| JP | 2011091936 | A | 5/2011 |
| JP | 2018174650 | A | 11/2018 |
| JP | 2020180347 | A | 11/2020 |
| KR | 1020200089741 | A | 7/2020 |
| WO | 2017170749 | A1 | 10/2017 |
| WO | 2019117095 | A1 | 6/2019 |
| WO | 2019182022 | A1 | 9/2019 |
| WO | 2021019859 | A1 | 2/2021 |

OTHER PUBLICATIONS

Aug. 5, 2024, the Extended European Search Report issued by the European Patent Office in the corresponding European Patent Application No. 22774883.7.

Huapeng Lin et al., Design of High-performance Permanent Magnet Synchronous Motor for Electric Aircraft Propulsion, 2018 21st International Conference on Electrical Machines and Systems (ICEMS), 2018, pp. 174-179.

Apr. 25, 2023, Notification of Reasons for Refusal issued by the Japan Patent Office in the corresponding Japanese Patent Application No. 2022-534316 with English language Concise Statement of Relevance.

Jul. 4, 2023, Official Decision of Refusal issued by the Japan Patent Office in the corresponding Japanese Patent Application No. 2022-534316 with English language Concise Statement of Relevance.

May 17, 2022, International Search Report issued in the International Patent Application No. PCT/JP2022/007743.

Jun. 20, 2025, Office Action issued by the Korean Intellectual Property Office in the corresponding Korean Patent Application No. 10-2023-7029704 with English language concise statement of relevance.

* cited by examiner

Evaluate constant current (CC) discharge properties by a charge-discharge device

↓

Calculate battery loss from a difference in voltage drop curves at 0.2 C and at a maximum output C rate Maximum output battery loss $W_b$ (W) = $\dfrac{\text{Energy (Wh)}}{\text{Discharge time (h)}}$ = $\dfrac{\int_0^{W_e} V(0.2C)dW - \int_0^{W_e} V(C_{max})dW}{1/C_{max}}$

BATTERY-DRIVEN MOTOR AND MOTOR-DRIVEN SYSTEM

TECHNICAL FIELD

The present disclosure relates to a battery-driven motor and a motor-driven system. In particular, the present disclosure relates to a battery-driven motor and a motor-driven system driven at a high speed, suitable for use in a battery powered cordless home appliance, electric vehicle (EV), cutting equipment, drone, and the like.

BACKGROUND

A motor driven by electric power supplied from a battery is required to be highly efficient and capable of operating for a long period of time. On the other hand, there is high demand for reduction of overall dimensions and weight of equipment. These are often trade-offs, and achieving both at a high level is technically difficult. In other words, relatively high efficiency in a motor is easily obtained by increasing dimensions and decreasing magnetizing flux density of an iron core, for example, but weight and dimensions increase accordingly. Further, maximum revolution speed may be increased in order to downsize a motor, but electric power supply voltage limitations exist for a motor driven by electric power supplied from a battery as described above, so the power supply side needs to be addressed. For example, a method to secure a high voltage for high-speed revolutions could be to provide a voltage booster circuit, but this would inevitably increase overall dimensions and weight of equipment, and as a result, would offset size reduction achieved by a higher motor speed.

Application of high magnetic flux density and low iron loss material as an iron core material is known to be effective in improving motor efficiency and output power, not only for a motor as described above. However, there are limits to improvement of iron loss and magnetic flux density of an iron core material, and even for the same motor, a required material property changes depending on operating conditions. Ideal iron core material properties have not been made clear, especially under the electric power supply constraints of battery operation, and selection of optimal materials for a battery-driven motor and optimizing overall efficiency, dimensions, and weight of equipment has not been achieved. In response to such circumstances, in some special applications such as automobile racing, an iron core material such as permendur (Fe—Co alloy), which has an excellent saturation magnetic flux density property, is sometimes used (for example, JP 2018-174650 A (PTL 1)).

CITATION LIST

Patent Literature

PTL 1: JP 2018-174650 A

SUMMARY

Technical Problem

Here, the cost of permendur is relatively high and the supply of Co can be unstable. Therefore, there is demand for a technology that is able to optimize overall efficiency, dimensions, and weight of equipment using highly available non-oriented electrical steel sheets.

In order to solve the above technical problem, it would be helpful to provide a battery-driven motor and a motor-driven system that achieve a high output density without compromising overall system efficiency.

Solution to Problem

In view of the above technical problem, the inventors of the present disclosure have intensively studied iron core materials having electromagnetic properties suitable for high-speed motors. As a result, it was found that, when a motor-driven system has a battery supply current of 3.0 C or higher to meet a maximum motor output requirement, using an electrical steel sheet as a motor iron core material having a magnetic flux density ($B_{50}$) of 1.65 T or higher when magnetic field strength is 5,000 A/m and an iron loss ($W_{10/1000}$) of 40.0 W/kg or less under sinusoidal excitation of 1 kHz-1.0 T effectively reduces overall system loss and achieves both output density and efficiency.

A battery-driven motor according to an embodiment of the present disclosure is, a battery-driven motor supplied electric power from a battery via an inverter to drive a load, wherein current supplied from the battery is 3.0 C or more when driven at maximum output, the battery-driven motor comprising a stator core provided with an electrical steel sheet as an iron core material that has a magnetic flux density of 1.65 T or more at a magnetic field strength of 5,000 A/m and an iron loss of 40.0 W/kg or less under sinusoidal excitation of 1 kHz-1.0 T.

Further, a motor-driven system according to an embodiment of the present disclosure comprises:

a battery;
an inverter; and
a battery-driven motor supplied electric power from a battery via an inverter to drive a load, wherein current supplied from the battery is 3.0 C or more when driven at maximum output, the battery-driven motor comprising a stator core provided with an electrical steel sheet as an iron core material that has a magnetic flux density of 1.65 T or more at a magnetic field strength of 5,000 A/m and an iron loss of 40.0 W/kg or less under sinusoidal excitation of 1 kHz-1.0 T.

Advantageous Effect

According to the present disclosure, a battery-driven motor and a motor-driven system that achieve high output density without compromising overall system efficiency is provided.

DETAILED DESCRIPTION

Figure 1:
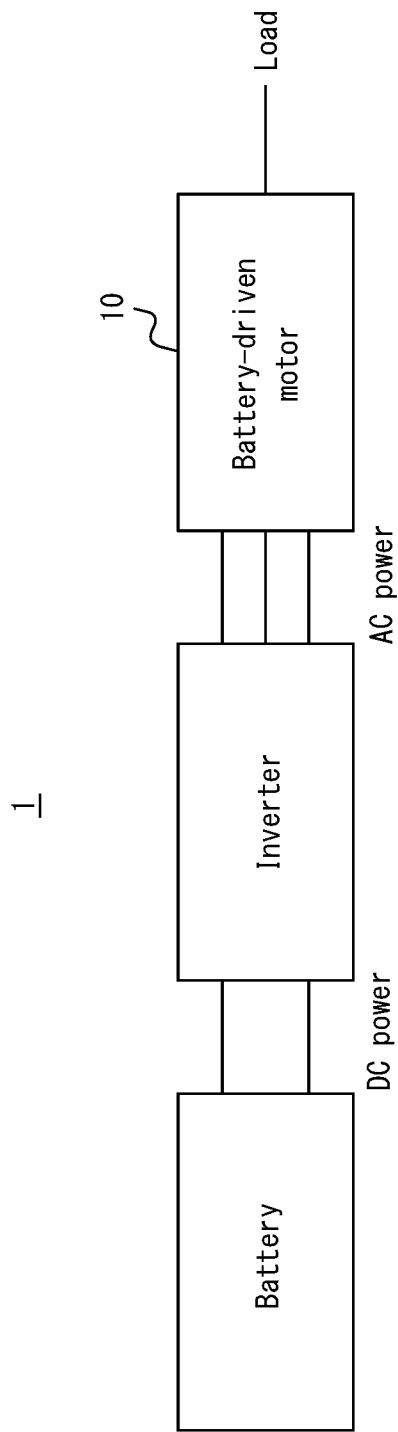
FIG. 1 schematically illustrates structure of a battery-driven motor according to an embodiment of the present disclosure.

FIG. 1 schematically illustrates structure of a battery-driven motor 10 according to an embodiment of the present disclosure. The battery-driven motor 10 is supplied electric power from a battery via an inverter that converts direct current (DC) power to alternating current (AC) power to drive a load. The battery-driven motor 10, the battery, and the inverter constitute a motor-driven system 1, as illustrated in FIG. 1.

The motor-driven system 1 may be used in battery-driven equipment such as an electric vehicle, a vacuum cleaner, a drone, and the like. The battery-driven motor 10 has a load such as a rotating shaft provided in the battery-driven equipment.

Requirements for an electrical steel sheet that is a core material of the battery-driven motor 10, and a reason for such limitation are described below. Here, there are no restrictions on the type of the battery-driven motor 10. Further, composition and production processes are not restricted as long as specified magnetic properties of an electrical steel sheet are obtained. In the following description, "%" means "mass %" with respect to composition amounts.

As an electrical steel sheet used as the core material of the battery-driven motor 10, a steel sheet that meets the requirements described below should be selected.

(Current Supplied from the Battery at Maximum Output is 3.0 C or More)

To achieve an increase in output density of a motor, it is advantageous to apply a power source that has a large capacity, that is, capable of supplying power at a high voltage and a high current. However, a system driven by a power supply from a battery has a voltage restriction, and inclusion of a voltage booster circuit increases size and weight. Therefore, according to the present embodiment, lithium-ion battery cells are connected in series or parallel or a combination of series and parallel, depending on a voltage required to drive the motor, to reduce overall system loss in a system suitable for high-output density of the motor by supplying current at a relatively large discharge rate of 3.0 C or more. Battery loss Wb, described below, is proportional to the square of the discharge rate (C rate) (see FIG. 3). However, by applying the structure of the present embodiment, current may be reduced and battery loss may be effectively reduced compared to conventional technology. The C rate indicates speed of discharge, and 1 C is defined as an amount of current that fully discharges nominal capacity of the battery in one hour. For example, 2.0 C is the amount of current that will fully discharge the nominal capacity of the battery in 0.5 hours. The higher the C rate value of the battery's maximum discharge condition, the greater the battery loss, but the higher the value, the higher the output density of the motor, and the easier it is to achieve the effect of reducing overall system loss by application of the present technology. Therefore, the C rate is preferably 5.0 C or higher, and more preferably 8.0 C or higher. On the other hand, when a maximum C rate is lower than 3.0 C, the effect is difficult to obtain.

Further, battery loss reduction directly contributes to suppression of temperature rise in the battery, which is also effective in suppressing degradation of the battery due to charge-discharge cycles. This is one major advantage of the battery-driven motor 10 and the motor-driven system 1 according to the present embodiment.

The number of lithium-ion batteries connected in series may be adjusted according to the required voltage, as described above. Depending on the required dimensions and continuous drive time of the motor-driven system 1, more lithium-ion batteries may be connected in parallel. Lithium-ion batteries are a preferred battery type to achieve high energy density and high-output density. However, the battery type is not limited to this example.

(Battery Loss Wb)

Figure 2:
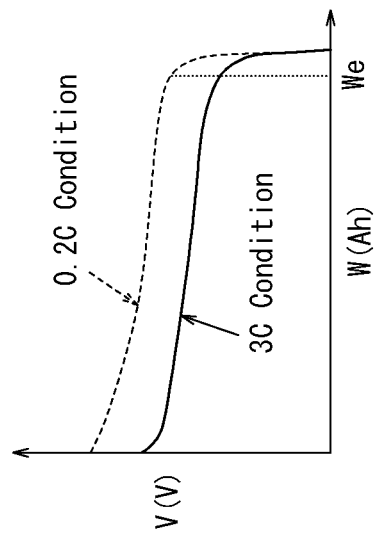
FIG. 2 illustrates a battery loss evaluation flow and a definition of battery loss Wb.

FIG. 2 illustrates an evaluation flow of battery loss Wb. First, constant current (CC) discharge properties are evaluated in a charge-discharge device. In detail, a constant current discharge test is conducted using a method described in "JIS C 8711" at 0.2 C (a current value that reaches a discharge termination voltage in 5 hours) and a discharge rate when the motor is driven at maximum output. By integrating a curve of discharge capacity W (Ah) and voltage between terminals V (V), an amount of electrical work (Wh) provided by the battery to an external system may be calculated. The battery loss Wb (W) is then calculated from a difference between voltage drop curves at 0.2 C and the C rate at maximum output. Specifically, dividing the difference (energy (Wh) illustrated in FIG. 2) by discharge time (h) yields the battery loss Wb (W) at maximum output per unit time. When the C rate at maximum output (maximum C rate) is, for example, 3.0 C, then V ($C_{max}$) in the formula illustrated in FIG. 2 is V (3.0 C). Further, 1/C. of the discharge time is 1/(3.0).

Figure 3:
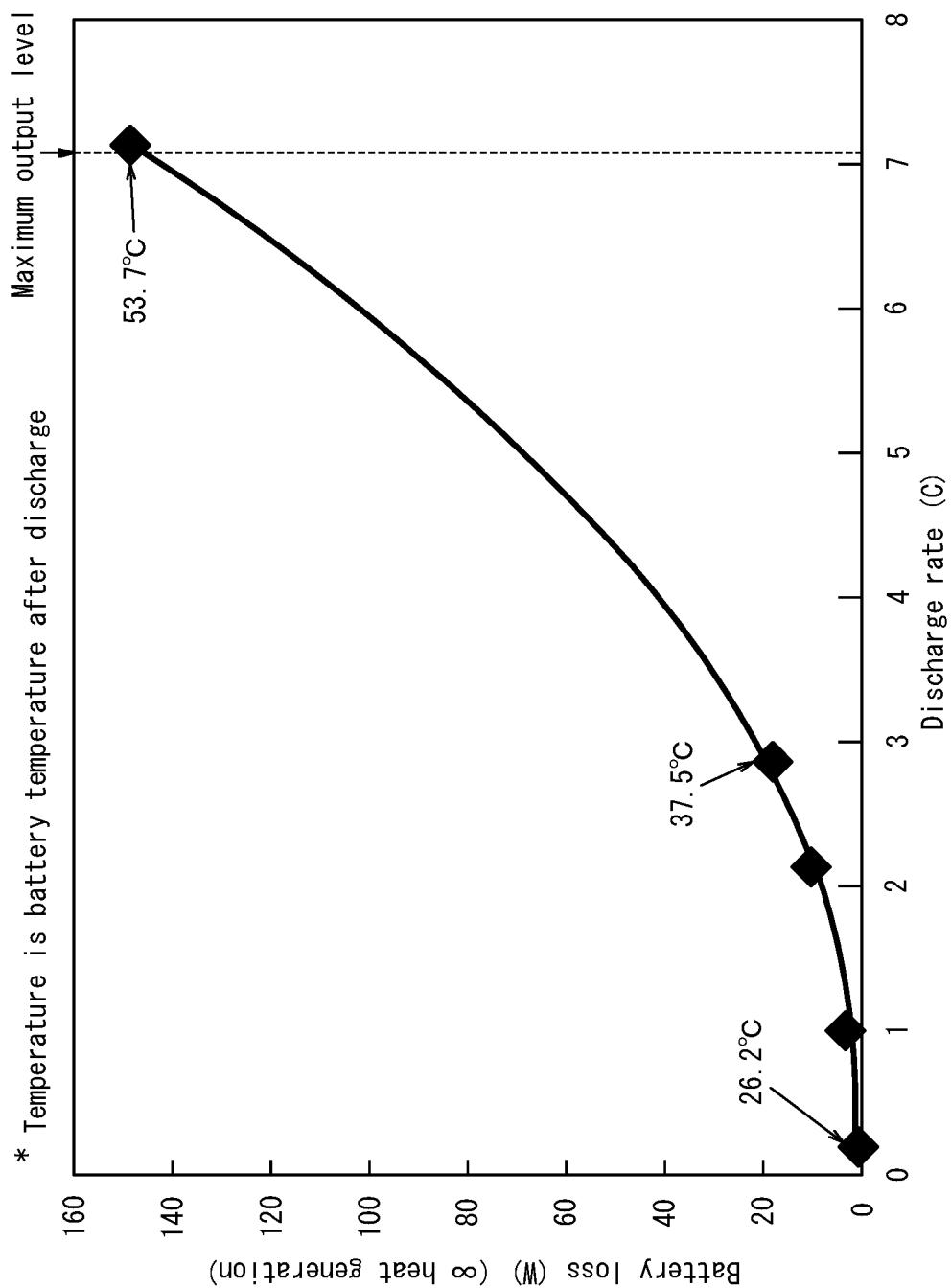
FIG. 3 illustrates an example of actual measurement evaluation results of battery loss in a battery-driven motor.

FIG. 3 illustrates an example of battery loss Wb measurement results for a lithium-ion battery having a rated voltage of 21.6 V and a rated capacity of 2.8 Ah. A charge-discharge device PFX2512 manufactured by Kikusui Electronics Corp. was used for the measurements. As long as a similar constant current discharge test may be performed according to voltage/current capacity to be evaluated, any evaluation device may be used. Further, evaluating large battery packs with many cells connected is difficult, such as those used in electric vehicles, and therefore a charge-discharge test may be performed by extracting some cells or a single cell. As illustrated in FIG. 3, as the discharge rate increases, the battery loss Wb increases. Here, when the battery loss Wb relative to the motor loss Wm (iron loss and copper loss) satisfies Wm≤Wb, an effect of reducing motor current proportional to battery current is effectively produced. More preferably, Wm×2.0≤Wb. Therefore, iron core material is preferably selected so that this relationship is satisfied.

(Electrical Steel Sheet Properties)

The higher the magnetic flux density ($B_{50}$) of a material, the higher the torque of the motor, and therefore motor current is reduced when compared to the same torque. Therefore, the magnetic flux density ($B_{50}$) of a selected iron core material is preferably 1.65 T or more. Here, the magnetic flux density ($B_{50}$) is magnetic flux density at a magnetic field strength of 5,000 A/m. There is no particular upper limit. Magnetic flux density ($B_{600}$) is preferably 1.95 T or more to effectively contribute to higher torque (that is, lower current), particularly when iron core material is near magnetic saturation in driving at maximum motor output. More preferable is 2.00 T or more. Here, the magnetic flux density ($B_{600}$) is magnetic flux density at a magnetic field strength of 60,000 A/m. Iron loss ($W_{10/1000}$) is an effective indicator of iron loss reduction during motor drive. Therefore, the iron loss ($W_{10/1000}$) of the selected iron core material is preferably 40.0 W/kg or less. More preferable is 30.0 W/kg or less. Here, the iron loss ($W_{10/1000}$) is iron loss under sinusoidal excitation at 1 kHz-1.0 T.

There are no other restrictions on an electrical steel sheet as long as the above magnetic properties are achieved. For example, differences in composition and production process of electrical steel sheets do not influence the effect. There are no special restrictions regarding insulating coating, as long as at least one surface is provided with a known insulating coating. Here, application of a Co—Fe alloy such as permendur, which is known as a high magnetic flux density soft magnetic material (magnetic flux density $B_{50}$ of 2.3 T or more), is not assumed due to high material cost and poor availability.

There is no restriction on thickness of the electrical steel sheet either, but thickness is preferably selected appropriately to satisfy the iron loss described above. An iron core material including Si may be selected. In many material grades of electrical steel sheet, there is a trade-off between magnetic flux density and iron loss, but distribution of Si concentration in a thickness direction allows for a reduction in iron loss at high frequencies while minimizing a decrease in magnetic flux density, making it relatively easy to achieve both high magnetic flux density and low iron loss. Further, there are no restrictions on processing and stacking method of electrical steel sheets, but a high stacking factor is preferred to effectively increase motor torque (reduce current) due to the high magnetic flux density property of material. For example, electrical steel sheets are preferably cut into a desired motor core shape by laser processing, vacuum impregnated with epoxy adhesive while applying pressure in a stacking direction, and work hardened to obtain a stacking factor of 90% or more.

(Maximum Motor Revolution Speed)

As mentioned above, high speed revolution is an effective means of increasing motor output density, and therefore a maximum revolution speed of 10,000 rpm or more is preferable. Depending on demand for smaller size and higher speed, or for supplied voltage value, speed may be further increased, and the maximum revolution speed is more preferably 20,000 rpm or more. The maximum revolution speed is even more preferably 50,000 rpm or more.

To reduce overall size and weight of a system, it is effective to reduce size of the motor, which is a heavy object, and particularly the iron core. Therefore, iron core material is preferably selected so that output (kW) to weight (kg) of the iron core of the motor exceeds 5 kW/kg. More preferable is 7 kW/kg. Even more preferable is 10 kW/kg.

As mentioned above, there is no restriction on the type of the battery-driven motor 10, and any type may be effective. However, a surface permanent magnet (SPM) motor or an interior permanent magnet (IPM) motor using a magnet are preferred to increase the output density and efficiency of the motor.

EXAMPLES

Examples and comparative examples are provided below, but the present disclosure is not limited to the conditions used in the following examples.

Example 1

Figure 4:
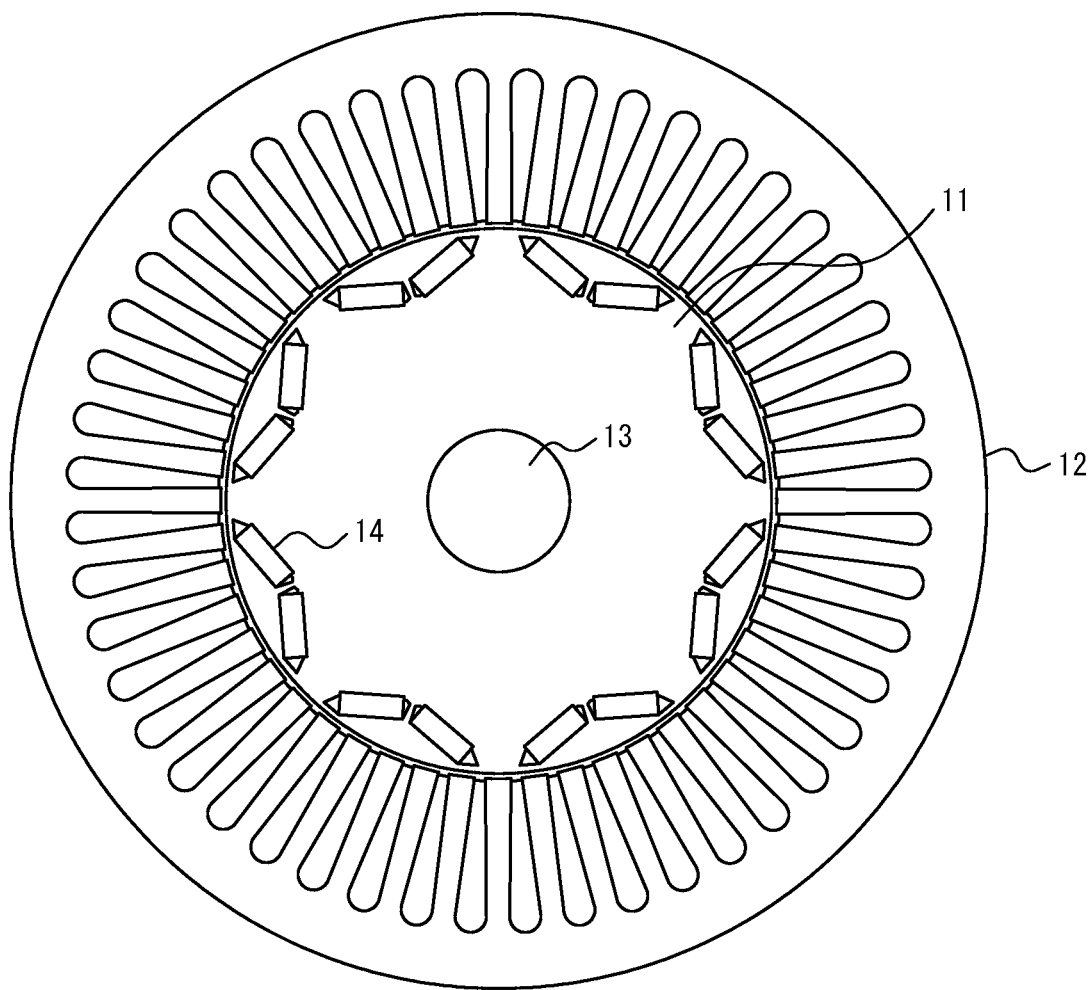
FIG. 4 illustrates an example of a battery-driven motor fabricated as an interior permanent magnet (IPM) motor.

An IPM motor having a form illustrated in FIG. 4 was fabricated using an electrical steel sheet indicated in Table 1 as an iron core material. The fabricated IPM motor includes a rotor core 11, a stator core 12, a shaft 13, and magnets 14. The iron core was processed by blanking with a press mold and stacking by caulking. The magnets 14 were inserted into the resulting rotor core 11, and a winding was applied to the stator core 12. These were assembled to produce the IPM motor. Further, 200 lithium-ion battery cells (3.6 V) were provided to power the IPM motor. Two series of 100 of these cells were connected in parallel to obtain a battery with a total voltage of 360 V.

TABLE 1

| Iron core material | $W_{10/1000}$ (W/kg) | $B_{50}$ (T) | $B_{600}$ (T) | Iron core weight (kg) | Remarks |
|---|---|---|---|---|---|
| A | 26 | 1.66 | 2.00 | 1.83 | Example 1 |
| B | 60 | 1.68 | 1.97 | 1.81 | Comparative Example 1 |
| C | 26 | 1.53 | 1.88 | 1.80 | Comparative Example 2 |

The battery and the motor were controlled by the motor-driven system 1 that includes an inverter and was configured so that current supplied by the battery at maximum motor output was 4.0 C. Here, the lithium-ion battery cell used was evaluated according to FIG. 2, and the battery loss Wb was 10 W at 4.0 C. In other words, the battery loss Wb for the entire battery (200 cells) was 2 kW.

Table 2 indicates results of evaluating the output and the motor loss Wm for the fabricated IPM motor when operated at maximum output (18,000 rpm). The motor in the example using iron core material A that has magnetic properties included in defined ranges had a higher maximum output and a higher maximum motor output density (kW/kg) relative to the motor iron core weight. Here, the defined ranges are the magnetic flux density ($B_{50}$) of 1.65 T or more at the magnetic field strength of 5,000 A/m and the iron loss ($W_{10/1000}$) of 40.0 W/kg or less under sinusoidal excitation of 1 kHz-1.0 T.

TABLE 2

| Iron core material | Maximum motor output (kW) | Wb (kW) | Wm (kW) | Wb ≥ Wm | Maximum motor output density per weight of motor iron core (kW/kg) | Remarks |
|---|---|---|---|---|---|---|
| A | 15 | 2 | 0.9 | ○ | 8.2 | Example 1 |
| B | 14.2 | 2 | 2.2 | x | 7.8 | Comparative Example 1 |
| C | 14.2 | 2 | 1.2 | ○ | 7.9 | Comparative Example 2 |

Table 3, on the other hand, indicates results of measuring time from a fully charged battery to motor shutdown and battery temperature immediately after shutdown when the same motors were driven at 12 kW (10,000 rpm) motor output.

TABLE 3

| Iron core material | Battery life (min) | Battery temperature after shutdown (° C.) | Remarks |
|---|---|---|---|
| A | 20 | 48 | Example 1 |
| B | 18 | 59 | Comparative Example 1 |
| C | 17 | 62 | Comparative Example 2 |

The example using iron core material A had a battery life that was at least 10% longer than for the comparative examples using iron core materials B and C, indicating that the motor is excellent as a motor for battery-driven equipment. Further, a reduction of 10° C. or more was achieved with respect to the battery temperature after motor shutdown for the example. This is due to the reduction of battery loss, which is expected to not only reduce a risk of failure due to thermal runaway of the battery, but al so to have a positive impact on cycle properties through repeated use.

Examples 2-5

Figure 5:
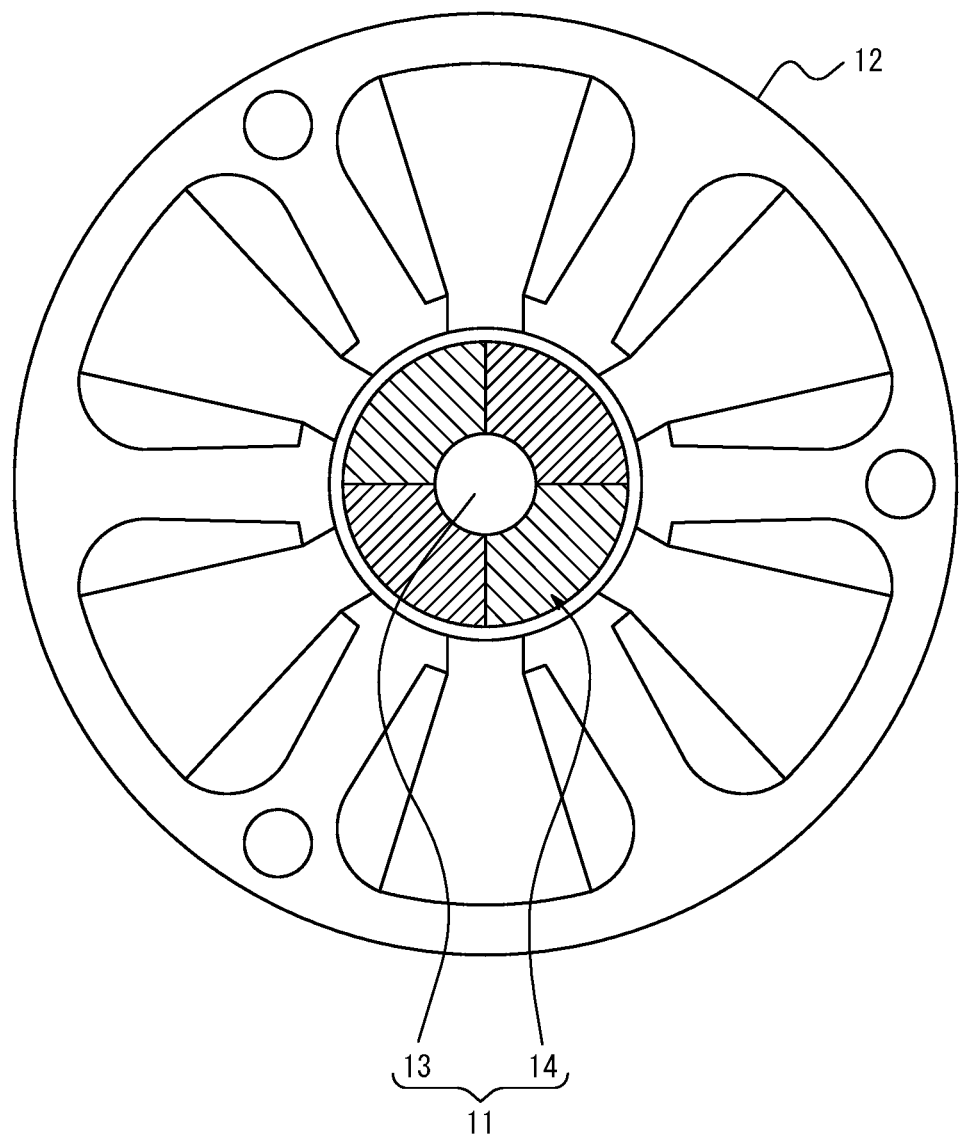
FIG. 5 illustrates an example of a battery-driven motor fabricated as a surface permanent magnet (SPM) motor.

The SPM motor having a form illustrated in FIG. 5 was fabricated using an electrical steel sheet indicated in Table 4 as an iron core material. The iron core materials A-C were the same as above. A new electrical steel sheet different from the core materials A-C was used as a core material D. The iron core was processed by blanking with a press mold and stacking by caulking.

TABLE 4

| Iron core material | $W_{10/1000}$ (W/kg) | $B_{50}$ (T) | $B_{600}$ (T) | Iron core weight (kg) | Remarks |
|---|---|---|---|---|---|
| A | 26 | 1.66 | 2.00 | 0.08 | Example 2, Example 4 |
| B | 60 | 1.68 | 1.97 | 0.08 | Comparative Example 3, Comparative Example 5 |
| C | 26 | 1.53 | 1.88 | 0.08 | Comparative Example 4, Comparative Example 6 |
| D | 37 | 1.68 | 2.08 | 0.08 | Example 3, Example 5 |

The resulting rotor core comprised a shaft and magnets, and a winding was applied to the stator core. These were assembled to produce the SPM motor. Lithium-ion battery cells (3.6 V) were provided to power the SPM motor. Seven of these cells were connected in series (7 series) or two series in parallel (7 series×2 parallel) to obtain a battery having a total voltage of 25.2 V.

The battery and the motor were controlled by the motor-driven system 1 that includes an inverter and was configured so that current supplied from the battery at maximum motor output was 6.0 C for the seven-cell series and 3.0 C for the two parallel seven-cell series. Here, the lithium-ion battery cell used was evaluated according to FIG. 2, and the battery loss Wb was 20 W at 6.0 C. In other words, the battery loss Wb for the entire battery (7 cells) was 140 W. On the other hand, the battery loss at 3.0 C was 5 W. In other words, the battery loss Wb for the entire battery (14 cells) was 70 W.

Table 5 indicates results of evaluating the output and the motor loss Wm for the fabricated SPM motor when operated at maximum output (100,000 rpm). The motors in the example using the iron core materials A and D that have magnetic properties included in the defined ranges had a higher maximum output and a higher motor maximum output density relative to the motor iron core weight. Here, the defined ranges are the magnetic flux density ($B_{50}$) of 1.65 T or more at the magnetic field strength of 5,000 A/m and the iron loss ($W_{10/1000}$) of 40.0 W/kg or less under sinusoidal excitation of 1 kHz-1.0 T.

TABLE 5

| Iron core material | Battery structure | Maximum motor output (kW) | Wb (kW) | Wm (kW) | Wb ≥ Wm | Motor output per iron core weight | Remarks |
|---|---|---|---|---|---|---|---|
| A | 7 in series | 0.47 | 0.14 | 0.06 | ○ | 5.9 | Example 2 |
| B |  | 0.45 | 0.14 | 0.1 | ○ | 5.7 | Comparative Example 3 |
| C |  | 0.44 | 0.14 | 0.04 | ○ | 5.6 | Comparative Example 4 |
| D |  | 0.48 | 0.14 | 0.07 | ○ | 6.0 | Example 3 |
| A | 7 in series × 2 in parallel | 0.47 | 0.07 | 0.06 | ○ | 5.9 | Example 4 |
| B |  | 0.45 | 0.07 | 0.1 | x | 5.7 | Comparative Example 5 |
| C |  | 0.44 | 0.07 | 0.04 | ○ | 5.6 | Comparative Example 6 |
| D |  | 0.48 | 0.07 | 0.07 | ○ | 6.0 | Example 5 |

Table 6, on the other hand, indicates results of measuring time from a fully charged battery to motor shutdown and battery temperature immediately after shutdown when the same motors were driven at 0.4 kW (90,000 rpm) motor output.

TABLE 6

| Iron core material | Battery structure | Battery life (min) | Battery temperature after shutdown (° C.) | Remarks |
|---|---|---|---|---|
| A | 7 in series | 10 | 55 | Example 2 |
| B |  | 8 | 62 | Comparative Example 3 |
| C |  | 8.5 | 65 | Comparative Example 4 |
| D |  | 9.5 | 54 | Example 3 |
| A | 7 in series × 2 in parallel | 21 | 32 | Example 4 |
| B |  | 19 | 33 | Comparative Example 5 |
| C |  | 19 | 34 | Comparative Example 6 |
| D |  | 20.5 | 31 | Example 5 |

The examples using the iron core materials A and D had battery lives longer than the comparative examples using the iron core materials B and C, indicating that they are excellent as motors for battery-driven equipment. Further, a reduction in battery temperature after motor shutdown was also achieved for the examples. This is due to the reduction of battery loss, which is expected to not only reduce a risk of failure due to thermal runaway of the battery, but also to have a positive impact on cycle properties through repeated use. Further, among the examples, when the battery structure of a 7 series and a higher C rate were used (Examples 2 and 3), the battery lives were approximately 10% longer than for the comparative examples (Comparative Examples 3 and 4), and the battery temperatures after motor shutdown were approximately 10° C. lower, which indicates that the motors are outstandingly superior as motors for battery-driven equipment.

Figure 6:
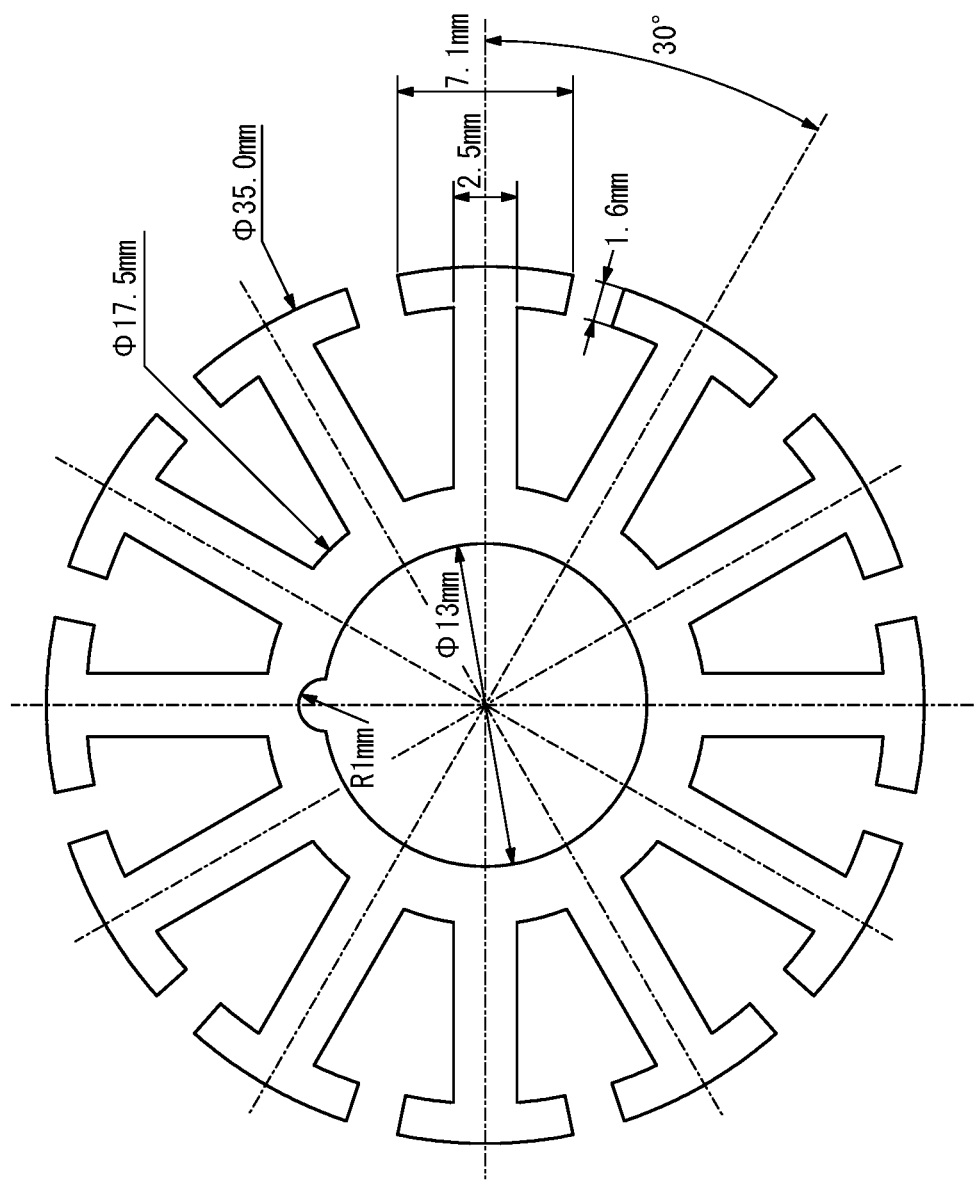
FIG. 6 illustrates shape of a fabricated iron core.

Iron core materials E and F indicated in Table 7 were then used to produce iron cores having a form illustrated in FIG. 6. Here, the motor type is a 14-pole outer rotor SPM. Weight of the iron core is 35 g. After blanking, the iron core was stacked to a height of 10.5 mm by adhesive stacking to make the motor core. Insulating coating and winding were applied to the resulting motor core, and assembled into a motor. Further, four lithium-ion battery cells (3.7 V) were connected in series to supply power to the motor, resulting in a battery having a total voltage of 14.8 V.

TABLE 7

| Iron core material | $W_{10/1000}$ (W/kg) | $B_{50}$ (T) | $B_{600}$ (T) | Si gradient | Battery life (min) | Wm (kW) | Wb (kW) | Remarks |
|---|---|---|---|---|---|---|---|---|
| E | 30 | 1.66 | 2.02 | None | 13 | 0.18 | 0.22 | Example |
| F | 31 | 1.67 | 2.04 | Present ($\Delta$Si = 1.5%) | 15 | 0.11 | 0.18 | Example |

Table 7 also indicates results of evaluation of time until motor drive could no longer be maintained for such a motor-driven system by continuously driving the motor at 10,000 rpm-0.31 Nm (325 W). Both the iron core materials E and F were examples that had nearly equivalent magnetic properties. However, the iron core materials E and F differed in presence or absence of a gradient of Si composition in the thickness direction. While the magnetic properties are almost the same, the battery life was improved by about 15% for the iron core material F, which indicates that an excellent motor system may be constructed when the thickness direction has the Si gradient. This result may be attributed to an effect of the Si gradient that suppresses degradation of the iron core material when processed into an iron core. Alternatively, material having the Si gradient may suppress adverse effects on magnetic properties due to stresses applied to the motor core by the insulation coating and winding. From the above, having the Si gradient in the disclosed battery-driven motor not only makes it easier to satisfy the required magnetic properties for the material, but also effectively improves the performance of the overall system when assembled as a motor.

As described above, the battery-driven motor 10 and the motor-driven system 1 of the present embodiment effectively reduce overall system loss and achieve both output density and efficiency through the above structure. In other words, the battery-driven motor 10 and the motor-driven system 1 of the present embodiment achieve a high output density without compromising overall system efficiency. Further, by application of the battery-driven motor and the motor-driven system 1, compact and highly efficient battery-driven equipment such as electric vehicles, vacuum cleaners, and drones may be realized.

Although embodiments of the present disclosure have been described based on the drawings and examples, it should be noted that a person skilled in the art may make variations and modifications based on the present disclosure. Therefore, it should be noted that such variations and modifications are included within the scope of the present disclosure.

REFERENCE SIGNS LIST

1 Motor-driven system
10 Battery-driven motor
11 Rotor core
12 Stator core
13 Shaft
14 Magnets

The invention claimed is:

1. A battery-driven motor supplied electric power from a battery via an inverter to drive a load, wherein
current supplied from the battery is 3.0 C or more when driven at maximum output, the battery-driven motor comprising
a stator core provided with an electrical steel sheet as an iron core material that has a magnetic flux density of 1.65 T or more at a magnetic field strength of 5,000 A/m and an iron loss of 40.0 W/kg or less under sinusoidal excitation of 1 kHz-1.0 T, wherein
the stator core is formed by blanking the electrical steel sheet and stacking the blanked electrical steel sheet, and has a Si gradient in a thickness direction, and
a battery loss Wb relative to a motor loss Wm of the battery-driven motor satisfies Wm≤Wb when driven at maximum output.

2. The battery-driven motor of claim 1, wherein the battery is a lithium-ion battery.

3. The battery-driven motor of claim 1, wherein a maximum revolution speed is 10,000 rpm or more and output in kW to iron core weight in kg is greater than 5 kW/kg.

4. The battery-driven motor of claim 1, wherein the electrical steel sheet has a magnetic flux density of 1.95 T or more at a magnetic field strength of 60,000 A/m and an iron loss of 30.0 W/kg or less under sinusoidal excitation of 1 kHz-1.0 T.

5. The battery-driven motor of claim 1, wherein the iron core material has a Si concentration distribution in a thickness direction.

6. A motor-driven system comprising:
a battery;
an inverter; and
a battery-driven motor supplied electric power from a battery via an inverter to drive a load, wherein
current supplied from the battery is 3.0 C or more when driven at maximum output, the battery-driven motor comprising
a stator core provided with an electrical steel sheet as an iron core material that has a magnetic flux density of 1.65 T or more at a magnetic field strength of 5,000 A/m and an iron loss of 40.0 W/kg or less under sinusoidal excitation of 1 kHz-1.0 T, wherein the stator core is formed by blanking the electrical steel sheet and stacking the blanked electrical steel sheet, and has a Si gradient in a thickness direction, and a battery loss Wb relative to a motor loss Wm of the battery-driven motor satisfies $Wm \leq Wb$ when driven at maximum output.

* * * * *